May 17, 1949.   W. C. RUECKEL   2,470,112
CERAMIC NOZZLE FOR REGENERATIVE
UNDERJET COKE OVENS
Filed June 26, 1944   2 Sheets-Sheet 1
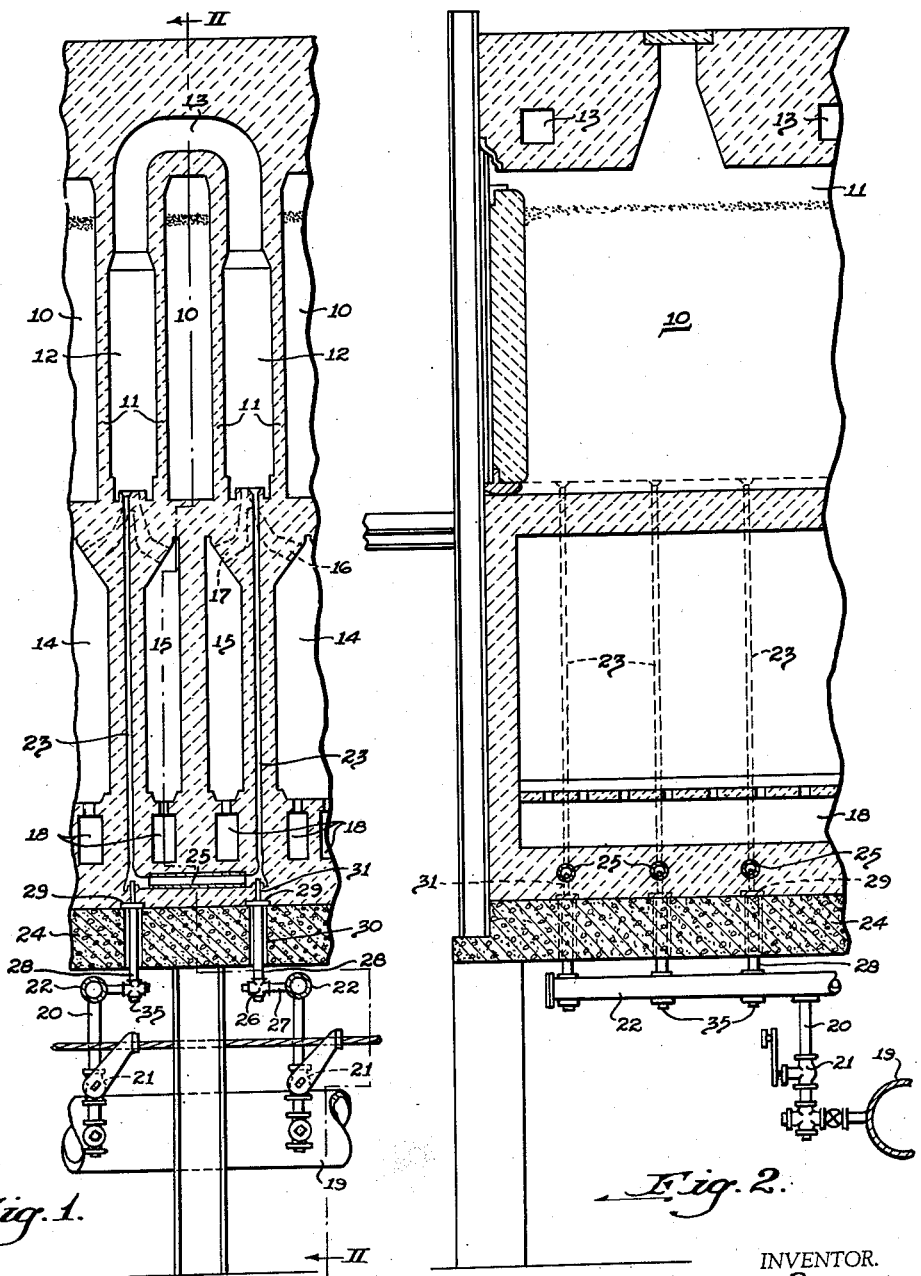
INVENTOR.
WALTER CLARENCE RUECKEL.
BY Thomas J. P. O'Brien
his ATTORNEY.

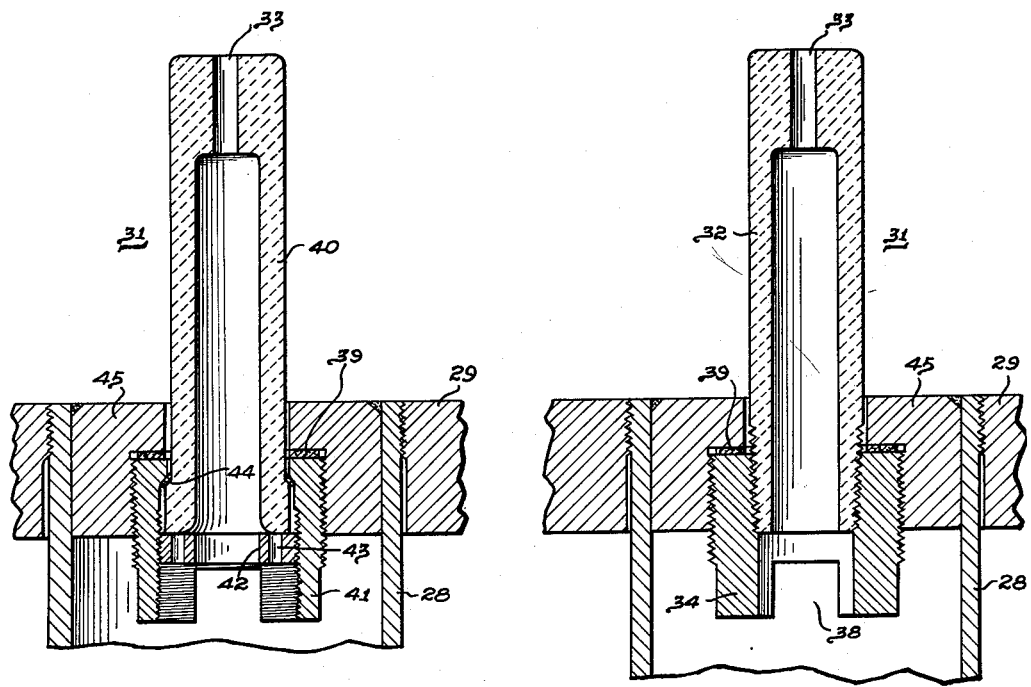
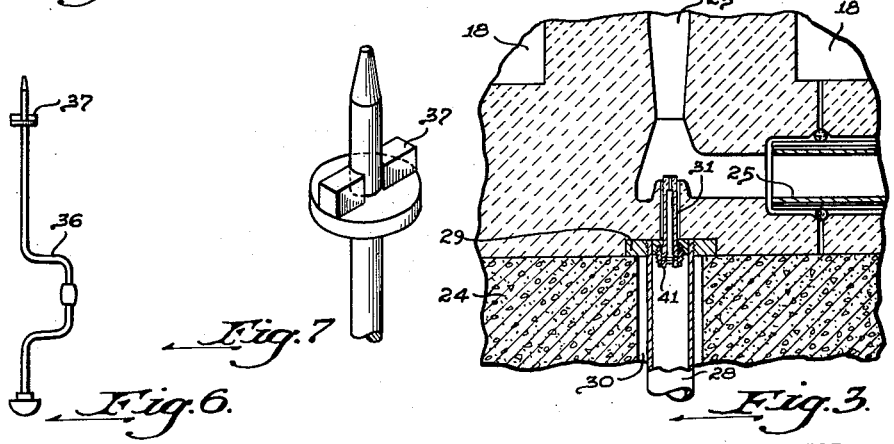

Patented May 17, 1949

2,470,112

UNITED STATES PATENT OFFICE 2,470,112

CERAMIC NOZZLE FOR REGENERATIVE UNDERJET COKE OVENS

Walter Clarence Rueckel, Pittsburgh, Pa., assignor, by mesne assignments, to Koppers Company, Inc., a corporation of Delaware Application June 26, 1944, Serial No. 542,161

4 Claims. (Cl. 202—142)

The present invention relates to improvements in apparatus for distributing combustion-media to the heating flues of underjet coke ovens and more especially to the heating flues of such of said coke ovens as are provided with that improvement set forth in Van Ackeren U. S. No. 2,036,678, issued December 29, 1942, whereby combustion-products are flowed, within the coke-oven structure itself and from heating flues containing the same, into admixture with heating gas in advance of the latter's delivery into co-operative flame-flues of the coke oven for the purpose of reducing the calorific value per unit volume of said heating gas and improving its combustion characteristics for coke-oven heating.

In coke ovens employing the underjet under-firing principle, the heating gas, and in some coke-oven structures even its combustion air, is distributed to the heating flues from wall header-pipes that usually extend crosswise of the coke-oven battery in substantial parallelism with the coke-oven heating walls thereabove. These wall header-pipes are located in the lower part of the battery structure and can optionally be either adjacently beneath the lower surface of the battery-supporting mat or incorporated within the structure of the mat itself. Each wall header-pipe is provided with spaced lateral perforations—usually one for each heating flue supplied thereby with a combustion medium.

By means of underjet ducts that extend upwardly through the masonry of the regenerator walls of the coke-oven battery and are each individual to a heating flue of a heating wall, fuel gas that is delivered through the aforesaid lateral perforations of the wall header-pipes is conducted into the lower part of the heating flues where it is burned with regeneratively-preheated air delivered into the heating flues from the regenerators of the battery structure. Appropriate pipe connections connect the above underjet ducts with said perforations in the wall header-pipes.

In order that each heating flue of a heating wall can be supplied with fuel gas at a rate calibrated in accordance with its position in a heating wall to maintain a relative uniform heating-wall temperature from the pusher-side to the coke-side of the adjacent coking chamber, replaceable gas-flow regulatory means are commonly disposed at an accessible position either within the aforesaid pipe connections or in the upwardly extending underjet ducts themselves. These gas-flow regulatory means function to reduce the effective cross-section of the combustion-media passageways wherein they are replaceably mounted.

Heretofore, these gas-flow regulatory means, have been made entirely of metallic substances which are disadvantageous because of the corrosive nature of the fuel gases, the high temperatures to which they can frequently be subjected and which depends upon their particular location in the battery structure, and also because of the acidic nature of combustion-products which commonly come into contact with said gas-flow regulatory means in all types of underjet coke ovens and especially in those coke-ovens embodying the improvement of the aforementioned Van Ackeren patent.

An object of the present invention is therefore to provide for combustion-media distribution systems of underjet coke ovens improved fluid-flow regulatory means that are relatively cheap to manufacture, are easily replaceable in such systems and exhibit high resistance both to the elevated temperatures they encounter in coke ovens and to corrosive action of the combustion media distributed thereby as well as also their combustion-products.

A further object of invention is to furnish for the stated purpose a non-metallic composition that is easily available and lends itself simply to fabrication into fluid-flow regulatory means having orifices that are accurate to within about one to two per cent of that orifice area predetermined for a given position thereof in the distribution system.

The invention has for further objects such other improvements and such other operative advantages or results as may be found to obtain in the processes or apparatus hereinafter described or claimed.

According to the present invention those regulatory devices, that are replaceably mounted in piping connections whereby in underjet coke ovens combustion-media are apportioned in calibrated quantities from primary distribution headers therefor to masonry conduits for eventual introduction into the combustion zones of the heating flues, are each formed as a calibrated ceramic body of low porosity that is highly refractory at elevated temperatures and is resistant to acidic gases such as sulphur dioxide, hydrogen sulphide, and the like. The said ceramic bodies are preferably molded products that have been fired to a sufficiently high temperature to provide them with a ceramic rather than a mere hydraulic or mechanical bond. They may be furnished with a glazed surface although this is not necessary for their effective use at relatively low pressure differentials as is shown by a hereinafter described composition that has been found very satisfactory for the purpose. Preferably the said ceramic bodies are each supported in a metallic plug or bushing the external threads of which are of such size and pitch as permit their being replaceably threaded into a correspondingly threaded section on the internal walls of those aforesaid pipe connections that communicably connect, for gaseous flow, the said combustion-media distribution headers and their associated masonry conduits in the coke-oven structure. The said ceramic bodies are themselves preferably removably supported on or in a said metallic plug or bushing by means of appropriate gasketing or cementing material including also, in certain embodiments, a threaded washer-member that supports a shoulder of the ceramic body in pressure contact with a co-acting shoulder on the interior surface of the threaded plug or bushing.

As hereinabove mentioned, the function of the instant combustion-media regulatory devices is calibrated to limit the effective cross-sectional area of each of the said piping connections that is available for the passage of combustion-media. They can be formed as obturator-like members that cause the passing gases to flow around them through an annulus in the pipe connections or they can be formed with central openings wherethrough the gases are delivered as streams or jets of lesser cross sectional area than the said piping connections. Either design of regulatory means can be advantageously constructed according to features of the present improvement.

It is also within the scope of the instant invention and depending upon the specific location at which they are designed for use in the combustion-media distribution system to form the ceramic portions of the regulatory devices as centrally preforated flat discs that are sealed into a supporting metallic element provided with external threads for replaceably supporting them in the piping of the distribution system. Or, in those instances where it is preferred, or is required to produce a specific heating effect, that the outlet of the regulatory device be positioned adjacent coke-oven masonry that is at a relatively elevated temperature, the ceramic portions of said regulatory devices can be formed as quite elongated nozzle-like members the calibrated orifices of which in their operating positions are located at a relatively high level in the masonry of the coke-oven whereas the threaded metallic portion of said device is supported at a lower and cooler level of the coke-oven structure or of the aforementioned piping connections, where said metallic portion is less sensitive to the obtaining thermal conditions. Cold-rolled steel (SAEX-1112) has been proven satisfactory in the practice for forming the said metallic portions but they can of course, if preferred, be fabricated from resistant, but relatively expensive, alloys. Such an elongated regulatory device is illustrated in the accompanying drawings.

It is also feasible to furnish the ceramic bodies of the novel elongated regulatory devices each with a basal externally threaded section whereby they can be screwed into a supporting bushing and be thus supported by the latter, as shown in the accompanying drawing of one embodiment of the invention. However, this design has been found in practice less practical than that other design wherein the ceramic body is supported against the inner walls of a bushing merely by pressure of a metallic member that is itself provided with tightening threads.

Experience in the practice has shown that a porcelain ceramic body of the type employed in the electrical art is especially suitable for the present purpose. Ceramic stock of this said type can be quite simply formed in a stamping or a dry-press with minimum loss. The stamped or molded green bodies can be each thereafter fired to have orifice openings that are accurate to within about one or two per cent of that cross-sectional area calculated to furnish a given delivery of combustion medium to a heating flue along a coke-oven heating wall when the shrinkage of the stock upon firing is taken into account. An especially satisfactory ceramic body composition is one containing about 55% clay, 27.5% talc, 14% uncombined silica, and 3.5% lime; a small amount of water added to this ceramic stock facilitates molding of the ceramic body.

In the accompanying drawings forming a part of this specification and showing for purposes of exemplification a preferred apparatus and method in which the invention may be embodied and practiced but without limiting the claimed invention specifically to such illustrative instance or instances:

Fig. 1 is a diagrammatic vertical section taken longitudinally of a battery of the well-known Becker under-jet type of coke ovens wherein there is also embodied features set forth in the aforementioned Van Ackeren patent for admixing with a combustion-medium, in advance of its delivery into the flame-flues, combustion-products from corresponding combustion-products flues of the battery, as well as also novel features of the present invention;

Fig. 2 is a vertical section taken transversely of the battery of Fig. 1 along the line II—II thereof;

Fig. 3 is an enlarged view of a fraction of Fig. 1 and showing in greater detail the improvement of the instant invention;

Fig. 4 is an enlarged view of one embodiment of the present improvement in regulatory devices for delivering calibrated quantities of a combustion-medium into the flow passageways therefor in underjet coke-oven heating systems;

Fig. 5 shows another and preferred form whereby to practice the present improvement in combustion-medium regulatory devices for underjet coke ovens;

Fig. 6 is an elevational view of apparatus suitable for removing from the battery structure a regulatory device of invention and replacing it by another; and Fig. 7 is an enlarged perspective view of a portion of Fig. 6.

The same characters of reference designate the same parts in each of the views of the drawings.

Referring now to the drawings and especially to Figs. 1 and 2, the illustrated battery comprises coking chambers 10 that are disposed in alternation with heating walls 11 lengthwise of the battery. The heating walls 11 are provided with a multiplicity of vertically disposed heating flues 12 which for gas-flow purposes are interconnected groupwise with a corresponding group in an adjacent heating wall by means of a cross-over duct 13 in the well-known manner characteristic of the Becker coke oven.

Each heating flue is at its lower end communicably connected individually with both a large and a small regenerator, respectively 14, 15, that extend transversely from one side of the battery to the other, by means of ducts 16, 17, located at the upper parts of said regenerators. The regenerators both serve to preheat combustion-air, in those instances where an associated coke oven is operated as a "coke oven," prior to introduction of such air into the heating flues for combustion purposes. At such times as an illustrated coke oven is being operated as a "gas oven," a lean fuel gas is preheated in the large regenerators 14 during that period of the regenerative-heating cycle when the heating flues immediately thereabove are operating as flame-flues, and the air for the combustion of said lean fuel gas is preheated in the adjacent small regenerators 15. Combustion-products from a flame-flue group of a heating wall flow over the top of the adjacent coking chamber by means of a cross-over duct 13 and, after traversing a corresponding group of combustion-products flues 12 in the adjacent heating wall, pass to a waste-heat flue by successively traversing one or another of a pair of regenerators 14 or 15, and their sole channel 18.

Thus, during a regenerative heating cycle for the illustrated coke ovens, all heating flues in a heating-flue group of a heating-wall function as flame-flues and combustion-products flues in alternation with a corresponding group of heating flues in an adjacent heating wall that is communicably connected therewith by means of a cross-over duct 13, and their associated regenerators 14, 15, likewise function in alternation either to preheat a combustion-medium, or media, or to carry their combustion-products out of the heating system for the battery.

Non-regeneratively-preheated rich fuel gas employed for combustion in the heating flues when the illustrated coke ovens are being operated as a "coke oven," is delivered to the heating flues thereof from a principal supplying main 19 for the whole battery. From said main 19, the rich fuel gas is delivered into a riser pipe 20, by valve means 21, whence it passes into a wall-header pipe 22 of which there is one for each heating wall of the battery. These wall-header pipes 22 extend crosswise of the battery in substantial parallelism with a heating wall above, and each heating flue of a said heating wall is communicably connected individually with its wall-header pipe by means of an underjet duct 23 that is formed in the masonry of a regenerator wall and extends from its port in the lower part of a heating flue downwardly to the lower surface of the concrete of the battery-supporting mat 24. At its lower end each said underjet duct 23 communicates by means of appropriate pipe connections with a lateral opening in a wall-header 22.

The underjet ducts 23 for those two adjacent heating walls that are communicably connected by the same cross-over ducts 13, are each individually interconnected, adjacent their lower ends, with the underjet duct of a corresponding heating flue in said adjacent heating wall by means of a horizontal conduit 25 that extends lengthwise of the battery and is formed in the masonry thereof.

Those pipe connections whereby the underjet ducts 23 communicate individually with their wall-header pipes 22 have an elbowed arrangement comprising a pipe-cross 26, one branch of which connects by a short pipe 27 directly with a wall-header pipe whereas an adjacent branch communicates with a vertically disposed pipe 28 that in effect is the lower extension of each underjet duct beneath the battery-masonry and carries said duct through the battery mat. As is clearly evident in Fig. 3, the upper end of pipe 28 is received into a similarly threaded metallic block 29 that rests on the upper surface of the battery-supporting mat 24 and in sliding contact therewith. The block 29 fits snugly into a recess in the masonry of the battery. Each pipe 28 extends vertically through a duct 30 that is formed in mat 24 and said duct is so shaped and is of sufficiently larger cross-section than said pipe to accommodate without its distortion any relative movement of pipe 28 in respect of the mat resulting from any differential expansion between the latter and the coke-oven masonry. Metallic block 29 being held in the coke-oven masonry, it integrally moves with the latter in its expansions and contractions independently of the mat; by means of the illustrated arrangement an underjet duct 23 is thus always simply retained in alignment with a pipe 28.

The combustion-media flow-regulatory means 31 of invention is clearly shown in Fig. 3 and in enlarged sections in Figs. 4 and 5. The latter two said figures represent different modifications of the improvement. In its form illustrated in the drawings, the said flow-regulatory means is nozzle-like in contour and comprises two principal parts, i. e., an elongated, hollow ceramic tube having a calibrated aperture 33 at its upper end for the passage of a combustion medium therethrough, and a metallic bushing-like part 34. In that modification shown in Fig. 4, the elongated ceramic tube 32 is provided at its lower end with threads that are adapted to permit its being rotated sufficiently in corresponding threads located on the inner walls of bushing-like member 34, that the two said parts are held securely together. The so-assembled metallo-ceramic flow-regulating device is replaceably secured in operating position in the combustion-medium distribution system for the coke-oven heating wall by means of that threaded section, on the exterior walls of the metallic bushing-like member 34, which is adapted for reception by the threaded section of the walls of the circular recess in the metallic disc 45 that is welded into the upper end of pipe 28 and partially seals that end of said pipe. Installation or replacement of the regulating means of invention is easily and simply performed by removing the lowest plug 35 from pipe-cross 26 and inserting into pipe 28 brace 36 (Fig. 6) having a bit-like section 37 that is adapted to be received by kerf 38 in the lower portion of bushing-like member 34 of the flow-regulating device. Depending on the direction of rotation of said brace, a said flow-regulating device of which the kerf is in engagement with the bit of said brace can be rotated into operating position in metallic disc 45 or removed therefrom or replaced. Gasket 39 provides a gas-tight seal between the members 45 and 34 so that a combustion-medium that is contained under pressure in pipe 28 cannot bypass calibrated orifice 33 of flow-regulating device 31 and be delivered to an underjet duct 23 in unmeasured quantities.

That modification of the instant improvement shown in Fig. 5 resembles the above-discussed modification shown in Fig. 4. However, in its form shown in Fig. 5, the ceramic part 40 is supported in the bushing-like member 41 by pressure against the inner walls of said member provided by a metallic annulus 42 that has exterior threads which are adapted to travel in a threaded section on the interior walls of said member 41. Annulus 42 is rotatable in member 41 by means of a tool adapted to engage spaced bores 43 in the former. To the end that the ceramic part 40 is supported in gas-tight contact with member 41, the exterior walls and interior walls respectively of the former and the latter are formed with registerable or co-acting inclined surfaces or shoulders that can be impressed into contact by rotation upwardly of annulus 42. A layer 44 of refractory sealing material such as graphitized asbestos or a settable cement between the two said inclined surfaces aids in making their contact gas-tight. In their manufacture allowance must be made for the differences in coefficients of expansion of the members 40, 41, at the temperatures to which they are subjected in coke-oven operation, otherwise the ceramic part may be shattered by expansion of its metallic support. It is also feasible for the purpose of protecting the ceramic body 40 to provide it with limited movement independently of the members 41, 42; for example, by disposing between the lower surface of member 40 and the upper surface of annulus 42 a resilient member such for example as a lock-washer.

In the specific application of the invention shown in Figs. 1, 2, of the drawings, the novel combustion-media flow-regulating device is employed for introducing rich heating-gas into the underjet ducts of the flame flues of underjet coke ovens, there being one such device for each heating flue of the coke oven. The rich heating-gas flows into said devices from a heating-wall header-pipe 22 wherein the gas is contained under superatmospheric pressure. Thence the heating-gas flows through a calibrated orifice 33 of each flow-regulating device as a jet that induces a flow of combustion-products to flow downwardly from a combustion-products flue, that is communicably connected at its upper end with the flame-flue by a cross-over duct 13, through the underjet duct 23 of said combustion-products flue and into conduit 25 whence the combustion-products are drawn into commingling with the jetted rich gas as their admixture ascends the flame-flue's underjet duct. This advantageously reduces the calorific value per unit volume of the heating gas delivered into the lower part of the flame flue from that which would otherwise obtain and improves its combustive characteristics for coke-oven heating, as set forth in the hereinbefore-mentioned Van Ackeren patent. The combustion-products circulated through said conduit 25 are at an elevated temperature, their relative humidity is high, and they contain acidic gases that are corrosive to many metals. By means of the improved jetting device of the invention, the circulated combustion-products come substantially only into contact with ceramic material (see Fig. 3) that is refractory to high temperatures and acidic gases. Thus, the calibrations of orifices 33 of the flow-regulating devices are highly resistant to heat and to corrosion and their form of calibrations remain unaltered for extended periods of coke-oven operation.

Advantageously, the ceramic portions of the flow-regulatory devices for the above specific application have an elongated tube-like structure that makes it possible for the metallic supporting-portion of such a device to be positioned at a point in the combustion-media distribution system of the coke oven which is relatively cooler and the opportunities for corrosion complications are importantly less than that point in the coke-oven structure where the jetting orifice is required to be positioned for its effective use.

In the hereinabove description emphasis has been placed on the utility of the instant improvement for apportionately distributing fuel gas to the heating flues of a coke oven. The invention is however of import in distributing any combustion medium, for example, air from header-pipes to various features, for example, the regenerator of an oven-heating system because as is well known to those skilled in the art, combustion-media distribution pipes that communicate with oven heating systems at a plurality of points spaced longitudinally of an associated heating wall can have a flow of corrosive combustion-products entering and circulating through them in consequence of that difference in static pressure which obtains at such spaced points during the "off period" of combustion-media flow therethrough and which is determined by the distance of said points from the sole-channel outlets of the regenerators.

The invention as hereinabove set forth is embodied in particular form and manner but may be variously embodied within the scope of the claims hereinafter made.

I claim:

1. In an underjet coke oven, a distribution system for delivering a combustion-medium into the underfiring system of said coke oven, comprising: a header-pipe having a plurality of outlets therealong; pipe-connections at a region so remote from the active combustion zone of the underfiring system of the oven as to be unaffected by the heat of active combustion in the combustion zone, for delivering said combustion-medium from said header-pipe outlets to different points in conduit means of said coke-oven underfiring system; and a device normally operative solely for regulating the inflow of said combustion medium from said header-pipe through a said pipe-connection, and in which said device comprises, a ceramic body that is of lesser cross-section than said pipe-connection and has a duct extending therethrough disposed for passing combustion-medium from said header-pipe into said conduit means of the coke-oven underfiring system and also has a surficial shoulder disposed for engagement by supporting means for said body, a bushing-like member having a threaded section on both its external and internal walls and also on the latter wall a surface adapted to register with said surficial supporting-shoulder of said ceramic body, and an externally threaded annulus that is disposed for rotation in said threaded section on the internal wall of the bushing-like member to hold said surficial shoulder of the ceramic body in registry with said internal surface of said member.

2. A regenerative underjet coke-oven, having an underjet distribution system comprising, a header pipe within the region of the base of the oven structure, and having a plurality of outlets therealong for delivering a combustion-medium into the underfiring system, pipe connections for delivering said combustion-medium from said header-pipe outlets to different points in conduit means of said coke-oven underfiring system, which conduit means is in open communication with combustion flues above regenerators in the lower part of the oven structure and through which lower part the conduit means extend upwardly to communicate with combustion flues, and changeable calibrative devices disposed at a region relative to the oven structure which is beneath, and therefore at a temperature below that of, the bottom of the regenerators, and accessible from beneath the oven structure, and primarily operative for calibratively regulating the limit of inflow to said conduit means of said combustion medium from said header pipe through said pipe connections; and in which said calibrative devices each comprise a ceramic body of such low porosity as to prevent by-passing of its calibration by the medium under pressure for calibrative discharge by the device, and of high resistance to both elevated temperatures and corrosive action it may encounter at the stated region below; said ceramic bodies being changeably mounted in gastight relation relative to their said pipe connection, and being disposed within the lower part of the oven structure between the lowermost surface of the oven supporting mat of the oven structure and a higher portion of the oven structure in the region of the soles of the regenerators, where the temperatures are in the neighborhood of the lowered temperatures of outflow gases leaving the regenerators during their outflow of waste gas therefrom; said changeable calibrated devices each being in the form of a ceramic body that is of lesser cross-section than its said pipe connection and has a duct extending therethrough calibrated for limitation of the amount of combustion medium passing therethrough, and also being provided with a surficial shoulder disposed for gastight engagement with supporting means for said body, a bushing-like member having a threaded section on both its external and internal walls and also on the latter wall a surface adapted to register with said surficial supporting-shoulder of said ceramic body, and an externally threaded annulus that is disposed for rotation in said threaded section on the internal wall of the bushing-like member to hold said surficial shoulder of the ceramic body in registry with said internal surface of said member.

3. A regenerative underjet coke oven operable with dilution of heating gas by waste gas comprising, coking chambers with heating walls arranged side by side in a row therewith and provided with vertical combustion flues, and regenerators below the coking chambers and heating walls, all supported on an oven mat above an accessible passageway; rich fuel gas ducts extending downwardly from the bases of said heating walls; waste gas ducts below the regenerators connecting the fuel gas ducts to a source of hot waste gases from within the oven heating flues, and changeable rich gas supply injector nozzles extending into said fuel gas ducts and opening thereinto at the juncture of said waste gas ducts with the rich fuel gas ducts, to furnish the diluting gas from the waste gas ducts to the rich fuel gas by the injector action of said rich gas injector nozzles; and in which the changeable rich gas supply injector nozzles each comprises a fired molded member of ceramic material having a calibrated aperture for limitation of the amount of rich gas calibratively ejected therethrough in the form of a jet which calibrated is located at the juncture of the waste gas ducts with the rich fuel gas ducts, and having the calibrated ceramic member interchangeably supported in gastight relation, through passageways accessible from the oven basement, with metal piping for connection with a rich fuel gas distribution header, said calibrated ceramic member comprising, fired ceramic bodies of such low porosity as to prevent by-passing of their calibrations by the rich gas under pressure for its calibrative discharge in the form of a jet at the velocity required to induce the flow of waste gas into the rich gas by the injector action of the latter, and said ceramic bodies being of ceramic material of high resistance to both the elevated temperatures and corrosive action of the gases passing in contact with the same at the juncture of the calibration of each injector nozzle with the said waste gas duct therewith, the calibrated ceramic member being interchangeably mounted by means of a surficial shoulder disposed for gastight engagement with supporting means for said body, a bushing-like member having a threaded section on both its external and internal walls and also on the latter wall a surface adapted to register with said surficial supporting shoulder of said ceramic body, and an externally threaded annulus that is disposed for rotation in said threaded section on the internal wall of the bushing-like member to hold said surficial shoulder of the ceramic body in registry with said internal surface of said member.

4. A regenerative underjet coke oven operable with dilution of heating gas by waste gas comprising, coking chambers with heating walls arranged side by side in a row therewith and providing two sets of vertical combustion flues operable in alternation with each other for concurrent inflow as flame flues and outflow as combustion products exhaust flues and regenerators below the coking chambers and heating walls, all supported on an oven mat above an accessible passageway; rich fuel gas ducts extending downwardly from the bases of said heating walls; waste gas ducts below the regenerators connecting the rich fuel gas ducts for the two sets of vertical combustion flues with each other for conveying waste gas from each set to the rich fuel gas ducts of the other set in alternation with each other, and changeable rich gas supply injector nozzles extending into said rich fuel gas ducts and opening thereinto at the juncture of said waste gas ducts with the rich fuel gas ducts, to furnish a diluting gas from the waste gas ducts to the rich fuel gas ducts by the injector action of said rich gas injector nozzles; and in which the changeable rich gas supply injector nozzles each comprises a fired molded member of ceramic material having a calibrated aperture for limitation of the amount of rich gas calibratively ejected therethrough in the form of a jet which calibration is located at the juncture of the waste gas ducts with the rich fuel gas ducts, and having the calibrated ceramic member interchangeably supported in gastight relation, through passageways accessible from the oven basement, with metal piping for connection with a rich fuel gas distribution header, said calibrated ceramic members comprising fired ceramic bodies of such low porosity as to prevent by-passing of their calibrations by the rich gas under pressure for its calibrative discharge in the form of a jet at the velocity required to induce the flow of waste gas into the rich gas by the injector action of the latter, and said ceramic bodies being of ceramic material of high resistance to both the elevated temperatures and corrosive action of the gases passing in contact with the same at the juncture of the calibration of each injector nozzle with the said waste gas duct therewith; the calibrated ceramic member being interchangeably mounted by means of a surficial shoulder disposed for gastight engagement with supporting means for said body, a bushing-like member having a threaded section on both its external and internal walls and also on the latter wall, a surface adapted to register with said surficial supporting shoulder of said ceramic body, and an externally threaded annulus that is disposed for rotation in said threaded section on the internal wall of the bushing-like member to hold said surficial shoulder of the ceramic body in registry with said internal surface of said member.

WALTER CLARENCE RUECKEL.

REFERENCES CITED

The following references are of record in the file of this patent:

UNITED STATES PATENTS

| Number | Name | Date |
|---|---|---|
| 2,073,448 | Fruth | Mar. 9, 1937 |
| 2,255,406 | Becker | Sept. 9, 1941 |
| 2,273,885 | Otto | Feb. 24, 1942 |
| 2,346,991 | Otto | Apr. 18, 1944 |

FOREIGN PATENTS

| Number | Country | Date |
|---|---|---|
| 506,256 | Great Britain | May 22, 1939 |

OTHER REFERENCES

New Principles in Heating Koppers-Becker Coke Ovens, by W. C. Rueckel, 1942, pages 8, 9, 10, 11, 12 and 13.